(12) United States Patent
Pribbernow et al.

(10) Patent No.: US 7,640,396 B2
(45) Date of Patent: Dec. 29, 2009

(54) ALL PURPOSE PROCESSOR IMPLEMENTATION TO SUPPORT DIFFERENT TYPES OF CACHE MEMORY ARCHITECTURES

(75) Inventors: Claus Pribbernow, Munich (DE); David Parker, Minneapolis, MN (US)

(73) Assignee: LSI Corporation, Milpitas, CA (US)

( * ) Notice: Subject to any disclaimer, the term of this patent is extended or adjusted under 35 U.S.C. 154(b) by 149 days.

(21) Appl. No.: 11/266,132

(22) Filed: Nov. 2, 2005

(65) Prior Publication Data

US 2007/0101062 A1    May 3, 2007

(51) Int. Cl.
*G06F 13/00* (2006.01)

(52) U.S. Cl. ............... 711/118; 711/120; 711/123

(58) Field of Classification Search ........... 711/118, 711/120, 123
See application file for complete search history.

(56) References Cited

U.S. PATENT DOCUMENTS

| | | | | |
|---|---|---|---|---|
| 5,513,119 | A * | 4/1996 | Moore et al. | 716/8 |
| 6,862,563 | B1 * | 3/2005 | Hakewill et al. | 703/14 |
| 7,055,113 | B2 * | 5/2006 | Broberg et al. | 716/1 |
| 7,069,523 | B2 * | 6/2006 | Nation et al. | 716/2 |
| 7,257,799 | B2 * | 8/2007 | McKenney et al. | 716/16 |
| 2004/0114622 | A1 | 6/2004 | Nation et al. | 370/465 |
| 2004/0117744 | A1 | 6/2004 | Nation et al. | 716/1 |
| 2004/0128626 | A1 | 7/2004 | Wingren et al. | 716/1 |
| 2004/0128641 | A1 | 7/2004 | Broberg, III et al. | 716/18 |
| 2004/0225972 | A1 | 11/2004 | Oeltjen et al. | 716/4 |
| 2004/0261050 | A1 | 12/2004 | Broberg, III et al. | 716/18 |
| 2005/0108495 | A1 | 5/2005 | McKenney et al. | 711/170 |

OTHER PUBLICATIONS

Microsoft Computer Dictionary, 5$^{th}$ edition, 2002, Microsoft Press, cover & copyright page.*
The Authoritative Dictionary of IEEE Standards Terms, 7$^{th}$ edition, 2000, IEEE Press, cover & copyright page.*
Newton's Telecom Dictionary, 2003, Harry Newton, CMP Books, cover & copyright page.*
DataSheet, *0.11μARM926EJ-S Processor*, LSI Logic Oct. 2004.

* cited by examiner

*Primary Examiner*—Pierre-Michel Bataille
*Assistant Examiner*—John P Fishburn
(74) *Attorney, Agent, or Firm*—Kermit D. Lopez; Luis M. Ortiz; Richard H. Krukar (57) ABSTRACT

A data-processing system and method are disclosed, which include a cached processor for processing data, and a plurality of memory components that communicate with the cached processor. The cached processor is separated from the memory components such that the cached processor provides support for the memory components, thereby providing a diffused memory architecture with diffused memory capabilities. The memory components can constitute, for example, memory devices such as diffused memory, matrix memory, R-Cell memory components, and the like, depending on design considerations.

13 Claims, 5 Drawing Sheets

ALL PURPOSE PROCESSOR IMPLEMENTATION TO SUPPORT DIFFERENT TYPES OF CACHE MEMORY ARCHITECTURES

TECHNICAL FIELD

Embodiments are generally related to data-processing methods, devices and systems. Embodiments are additionally related to cache memory, processor components and memory blocks associated with the design and construction of integrated circuits.

BACKGROUND

Integrated circuits comprise many transistors and the electrical interconnections between them. Depending upon the interconnection topology, transistors perform Boolean logic functions like AND, OR, NOT, NOR and are referred to as gates. Some fundamental anatomy of an integrated circuit will be helpful for a full understanding of the factors affecting the flexibility and difficulty to design an integrated circuit. An integrated circuit comprises layers of a semiconductor, usually silicon, with specific areas and specific layers having different concentrations of electron and hole carriers and/or insulators. The electrical conductivity of the layers and of the distinct areas within the layers is determined by the concentration of ions referred to as dopants that are implanted into these areas. In turn, these distinct areas interact with one another to form the transistors, diodes, and other electronic devices.

These devices interact with each other by electromagnetic field interactions or by direct electrical interconnections. Openings or windows are created for electrical connections through the layers by an assortment of processing techniques including masking, layering, and etching additional materials on top of the wafers. These electrical interconnections may be within the semiconductor or may lie above the semiconductor areas using a complex mesh of conductive layers, usually of metal such as aluminum, tungsten, or copper fabricated by deposition on the surface and then selectively removed. Any of these semiconductor or connectivity layers may be separated by insulative layers, e.g., silicon dioxide.

Integrated circuits and chips have become increasingly complex with the speed and capacity of chips doubling about every eighteen months because of the continuous advances in design software, fabrication technology, semiconductor materials, and chip design. An increased density of transistors per square centimeter and faster clock speeds, however, make it increasingly difficult to design and manufacture a chip that performs as actually desired. Unanticipated and sometimes subtle interactions between the transistors and other electronic structures may adversely affect the performance of the circuit. These difficulties increase the expense and risk of designing and fabricating chips, especially those that are custom designed for a specific application. The demand for complex custom designed chips has increased along with the demand for applications and products incorporating microprocessors, yet the time and money required to design chips have become a bottleneck to bring these products to market. Without an assured successful outcome within a specified time, the risks have risen with the costs, and the result is that fewer organizations are willing to attempt the design and manufacture of custom chips.

One of the primary areas of interest in the design of integrated electronic systems is the field of cached processors and related memory blocks and components. Examples of cached processors include ARM (Advanced RISC Machines) and MIPS (Microprocessor without Interlocking Pipeline Stages) processors. Such cached processors can be implemented in the context of a core processor configuration. One example of such a core processor configuration is a processor CoreWare™ (CW) hard macro (HM). Note that "CoreWare" is a trademark of LSI Logic Corporation. A hard macro (HM) is a complete physical implementation and addresses all requirements and design rules of the supported technology. Such a methodology has received wide acceptance in the integrated circuit industry, because implementation issues can be solved readily and the core ware (CW) integration at the chip level is predictable and can be executed efficiently. The hard macro implementation does not offer flexibility when it comes to supported cache size or processor specific configuration options. Thus, the often implemented processor hard macro is actually not a very good fit for typical customer requests.

One solution to these problems was the introduction of a flexible design for memory use in integrated circuits, which has been referred to as a "landing zone" technology or concept, and which results in the implementation of a cached processor. An example of this technology is disclosed in U.S. Patent Application Publication No. US 2005/0108495, entitled "Flexible Design for Memory Use in Integrated Circuits," which published on May 19, 2005 and is assigned to LSI Logic Corporation of Milpitas, Calif., U.S.A. U.S. Patent Application Publication No. US 2005/0108495, which is incorporated herein by reference in its entirety, generally describes a method for designing and using a partially manufactured semiconductor product is disclosed.

As disclosed in U.S. Patent Application Publication No. US 2005/0108495, the partially manufactured semiconductor product, referred to as a slice, which contains a fabric of configurable transistors and one or more areas of embedded memory. The method contemplates that a range of processors, processing elements, processing circuits exists which might be manufactured as a hard macro or configured from the transistor fabric of the slice. The method then evaluates all the memory requirements of all the processors in the range to create a memory superset to be embedded into the slice. The memory superset can then be mapped and routed to a particular memory for one of the processors within the range; ports can be mapped and routed to access the selected portions of the memory superset. If any memory is not used, then it and/or its adjoining transistor fabric can become a "landing zone" for other functions or registers or memories.

Such technology can be thought of as one possible hard macro methodology, with the additional features of the hard macro constructed on the configurable transistor fabric region of an ASIC platform, also known as an r-cell, and the use of diffused memory resources of the slice. The metal hard macro with known timing characteristics that "snap" to a specific location and set of memories in a given slice as, for example, "integrator 1," have been recognized by the integrated circuit industry as constituting an innovative concept. Thus, the technology disclosed in U.S. Patent Application Publication No. US 2005/0108495 can be utilized to enable a cached processor on an RC slice family "integrator 1" without the burden of developing processor specific slices.

Such "landing zone" technology, however, has several limitations, including reduced flexibility regarding processor type, the number of processors and the supported cache size. The "landing zone" concept supports only one processor hard macro implementation with a fixed cache size, while the demand from users and customers for multiple processor systems has increased, along with an increased demand for combinations of processor types and varying cache configurations.

One other related technology that has become more popular in recent years is the field of semi-programmable ASIC (Application Specific Integrated Circuit) devices. Integrated circuit foundries have begun to develop standard, or base, platforms, known as "slices" containing the base layers of an integrated circuit but without the metal interconnection layers. The base layers are patterned to form gates that can be configured into cells using tools supplied by the foundry. The chip designer designs additional metal layers for the base platform to thereby configure the integrated circuit into a custom ASIC employing a customer's technology.

An example of such a configurable base platform is the RapidChip® platform available from LSI Logic Corporation of Milpitas, Calif. The RapidChip® platform permits the development of complex, high-density ASICs in minimal time with significantly reduced design and manufacturing risks and costs. The design effort for a semi-programmable ASIC encompasses several stages. After the chip size has been selected and the input-output (I/O) cells have been placed in a layout pattern for the base platform, mega cells, including memories and other large hard macros (i.e., "hard-macs"), are placed. Thereafter, standard cells are placed to complete the chip design.

Consider a base platform containing basic sets of memories of a predetermined type, such as RRAMs. RRAMs are sets of memory of the same type that are placed compactly and have built-in testing and self-repairing capabilities. Usually, IC designers prefer not to use all the available memory sets of the RRAM so that unused memory sets are available for self-repairing processes. The base platform might also contain single memories such as single diffused memories. The design created by the IC designer may contain user-defined memories, herein, sometimes called customer memories, which are mapped into one or more of the pre-defined memory locations on the base platform.

Typically, a customer design includes one or more processors that run a sequence of stored instructions to perform tasks defined by a user program. Different instruction sets are used by different types of processors to complete the tasks defined in the program. For example, general purposes instruction sets are typical of microprocessors. Application specific instruction sets are used when it is required to speed up certain computational tasks. For example, a digital signal processor (DSP) embodies instruction sets that enhance computation of certain mathematical algorithms.

Different implementations of the same instruction sets are possible in hardware with different trade-offs of performance and resources. One common implementation in which this difference arises is how much support memory is available and how that memory is organized. For example, a processor might utilize cache memory for enabling a large address space to be mapped onto a smaller one, by re-using addresses. Another processor might utilize a tightly coupled memory (TCM) having a fixed address space, which is sufficient for most critical instructions of the program. During the design process, the support memory needed to support the processor is mapped to available memory locations that are pre-defined on the base platform, and the processor core is placed relative to the memory location.

The "landing zone" concept described above, while offering a number of advantages, is also limited because of its reduced flexibility with respect to processor type, the number of processors and supported cache sizes. The landing zone concept only supports one processor HM implementation, while the demand from users is for multiple processor systems. It is therefore believed that an all-purpose processor implementation is needed, which can support different types of cache memory architectures.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide for improved data-processing system and methods.

It is another aspect of the present invention to provide for an all purpose cached processor that supports different types of cache memory architectures.

It is a further aspect of the present invention to provide for a data-processing system in which a cached processor is provided that is separated from memory components.

The above and other aspects of the invention can be achieved as will now be briefly described. A data-processing system and method are disclosed, which include a cached processor for processing data, and a plurality of memory components that communicate with the cached processor. The cached processor is separated from the memory components such that the cached processor provides support for the memory components, thereby providing a diffused memory architecture with diffused memory capabilities. The memory components can constitute, for example, memory devices such as diffused memory, matrix memory, R-Cell memory components, and the like, depending on design considerations.

The cached processor and the memory components can be implemented in the context of one or more soft or hard macros that are separated from one another. A top level wrapper is generally utilized to compound the soft and/or hard macros. Additionally, a processor core can be provided, which communicates with the cached processor and the memory components. The systems and methods described herein thus can provide for a separation of cache memory and processor components, resulting in an all-purpose implementation of different cached processor memory architectures that support different cache sizes.

BRIEF DESCRIPTION OF THE DRAWINGS

The accompanying figures, in which like reference numerals refer to identical or functionally similar elements throughout the separate views and which are incorporated in and form part of the specification, further illustrate embodiments of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The embodiments described herein generally relate to the implementation of a cached processor that can be configured to support a set of memory components, such as, for example, a diffused memory or diffused memory bank, a Matrix RAM component, as well as any other set of a memory architecture, depending on design considerations. A combination of memory architecture with diffused memory, matrix memory and R-cell memory can be addressed by the configuration described and illustrated herein. Such features are generally achieved by the separation of a processor core and cached memory components into different modules and hard macros and/or soft macros. The processor core can be implemented such that it supports different cache memory hard macros. For each different memory architecture, a specific cache memory hard macro can be implemented. Additionally, a top-level wrapper can be utilized to compound the processor core hard macro with a slice specific cache memory hard macro.

Figure 1:
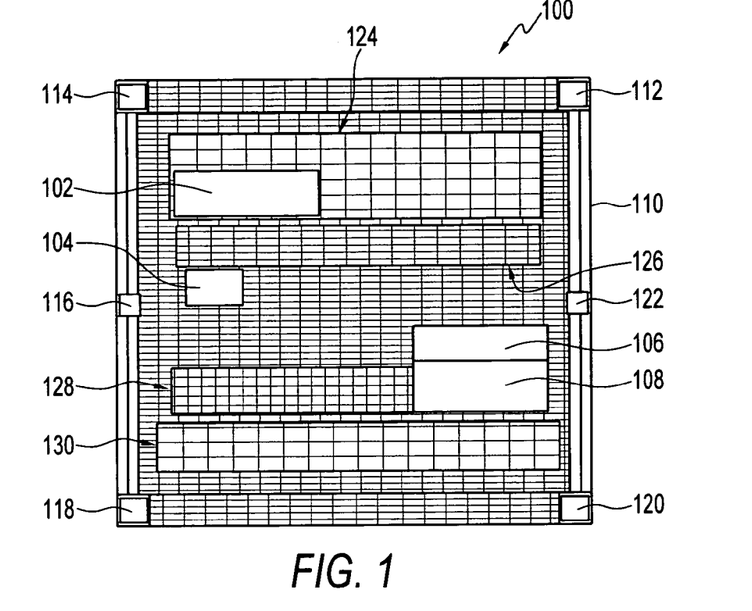
FIG. 1 illustrates a layout diagram of a cached processor core, which can be implemented in accordance with a preferred embodiment.

FIG. 1 illustrates a layout diagram of a complete die area 100, which can be implemented in accordance with a preferred embodiment. In general, the die area 100 is depicted in FIG. 1 can be referred to as a slice and can include, for example, an r-cell area, I/O Buffer, PLL, MatrixRAM etc. The die area 100 can be configured as a final product for a user or customer once it is customized by metal. A cached processor is generally formed from a combination of cached processor areas 108 and 106. A so called "cache-less" processor with tightly coupled memory (TCM) can be configured from areas 102 and 104. Area 102 can be, for example, a TCM memory. Area 116 can be implemented as, for example as a Phase Locked Loop (PLL) circuit, but is not of interest to the implementation of the embodiments disclosed herein, which can be configured with a variety of other types of circuits and electrical components.

The complete die area 100 depicted in FIG. 1 contains a general boundary 110 and includes at least one cached memory area 108 and a core area 106. Additionally, the complete die area or cached processor core 100 can include an ARM processor area 102 and a core area 116. Note that as utilized herein the term "ARM processor" refers generally to an ARM architecture (originally the Acorn RISC Machine), which is a 32-bit RISC (Reduced Instruction Set Computing) processor architecture that is widely used in a number of applications. ARM variants are in widespread use in embedded and low-power applications due to their power saving design features.

Core area 116 may be, for example, 1.5 mm by 1.1 mm, depending upon design considerations. Cache memory area 108 may be configured, for example, as an area of 40 (4×10) raw instances (512×20) (2rw). Other instances of an area 126 may be associated with the complete die area 100, but are not critical to the implementation of the die area 100. Note that other areas 112, 114, 116, 118, 120 and 122 can be provided, which may function as, in the context of, for example, a PLL circuit.

Areas 112, 114, 116, 118, 120 and 122 alternatively may simply be implemented as electrical contacts, depending upon design considerations. Again, however, such components are not critical to the implementation of die area 100, but are mentioned herein for general edification and illustrative purposes only. Other areas 128 and 130 can also be provided to implement various memory and/or other electrical components if necessary. Note that in FIGS. 1-6 depicted herein, identical parts or elements are generally referred to by identical reference numerals.

The die area 100 can also be integrated with electrical contacts 112, 114, 116, 118 120, and 122, which can provide electrical connection to the components contained by cached processor core 100. A plurality of instances 124 may also be implemented in association with die area 100. Note that area 104 can be implemented as a processor core, such as, for example, a TCM ARM Processor. Area 102 can be implemented as a cached memory (e.g., build in MatrixRAM). Multiple processor implementation of one type are possible, for example, by duplicating areas 102 and 104. Any other combination of other processor are possible as well as long as memory continues to reside inside, for example, the MatrixRAM) The configuration depicted in FIG. 1 generally supports all cached processor types. Examples of such cached processors include ARM 926, ARM 1026, ARM 1136, MIPS4Ke, MIPS5Kf, and MIPS24Kf.

The configuration illustrated in FIG. 1 also supports all TCM processors, such as, for example, ARM966, ARM1156, ZSP400, ZSP500, and ZSP540. The configuration depicted in FIG. 1 can also provide support for multiple processors and combinations of processors, such as, for example, a dual ARM966 and/or an ARM1136 with a ZSP500 processor. The advantages of such a configuration include maximum flexibility for processor, cache size and location.

Figure 2:
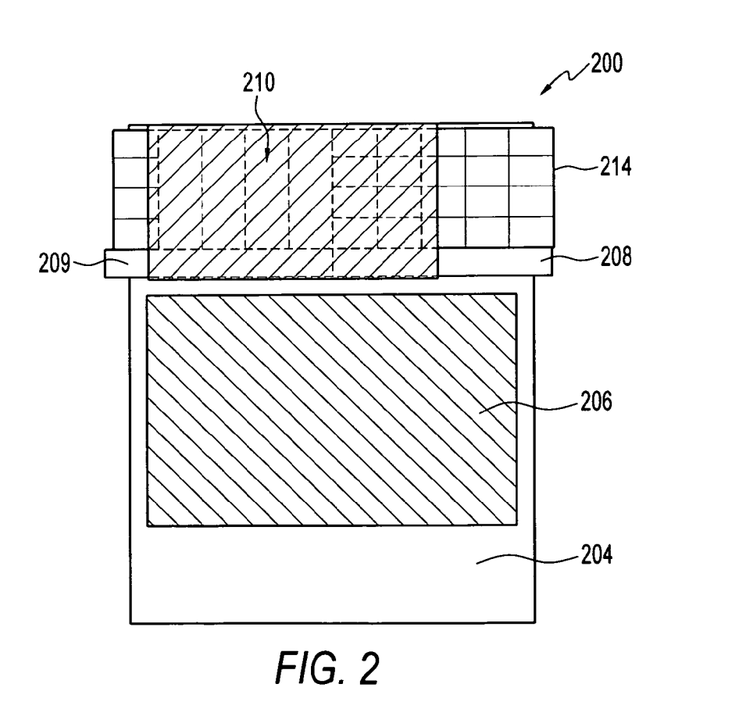
FIG. 2 illustrates a general layout diagram of a system that includes a processor core hard macro and memory tiles grouped together in a single block, in accordance with a preferred embodiment.

FIG. 2 illustrates a general layout diagram of a system 200 composed of a processor core hard macro 206 and memory tiles 214 grouped together in a single block, in accordance with a preferred embodiment, such as, for example, areas 108 and 106 illustrated in FIG. 1. The memory tiles 214 can be arranged into a subset or cache memory hard macro 210 (e.g., MRAM). Note that the cache memory hard macro 210 can be implemented as a slice-specific cache memory HM, depending upon design considerations. The processor core hard macro 206 is generally located above on a first top wrapper 204 (i.e., soft and/or hard). The memory tiles 214, which are arranged in a single block can be formed, for example, from an ARM 926 cache memory and as a hard macro matrix RAM basis. The memory tiles 214 are associated with the microprocessor.

The memory pins and microprocessor pins associated therewith can also be tightened to provide additional support. The processor core hard macro 206 can be provided without a fixed placement, but arranged in a slide and snap (tile base) configuration. The first top wrapper 204 can be utilized to group the cache memory hard macro 210 and processor core hard macro 206 together. A memory section 208 and a memory section 209 are located below or adjacent to the memory tiles 214. The cache memory hard macro 210 is therefore superimposed over and/or above the memory section 208 and the memory tiles 214, depending upon design considerations.

Figure 3:
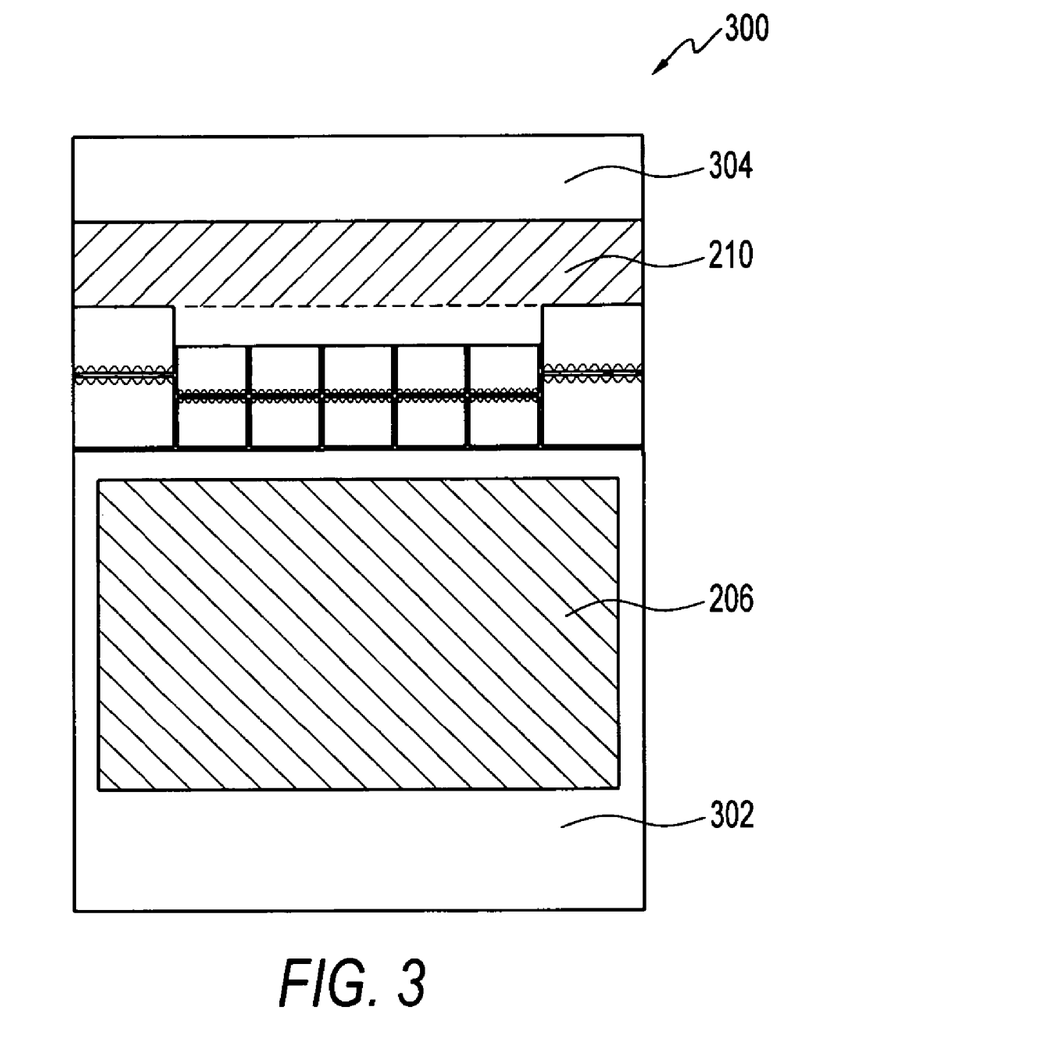
FIG. 3 illustrates a general layout diagram of a system that includes a cache memory hard macro and a second top wrapper, in accordance with a preferred embodiment.

FIG. 3 illustrates a general layout diagram of a system 300 that includes a cache memory hard macro 206 and a second top wrapper 302, in accordance with a preferred embodiment.

In the configuration depicted in FIG. 3, cache memory hard macro 210 is shown located adjacent a clear area 304 and the second top wrapper 302. In general, the cache memory hard macro 210 can be configured with a diffused memory bank of Integrator 1. Cache memory hard macro 210 may be implemented as a device such as, for example, ARM926, thereby constituting a diffused memory "Landing Zone 1".

Additionally, the general layout depicted in FIG. 3, can be provided with the second top wrapper 302 in order to group the cache memories (i.e., cache memory hard macro 210) and processor core hard macro 206. The same core utilized for MRAM purposes can be utilized for diffused RAM. Note that as utilized herein the term "RAM" refers generally to "Random Access Memory". Processor core hard macro 206 depicted in FIG. 3 can be implemented, for example, as an ARM926 core hard macro. Associated memory pins, cache controller and microprocessor pins can be tightened in order to implement the configuration depicted in FIG. 3.

Figure 4:
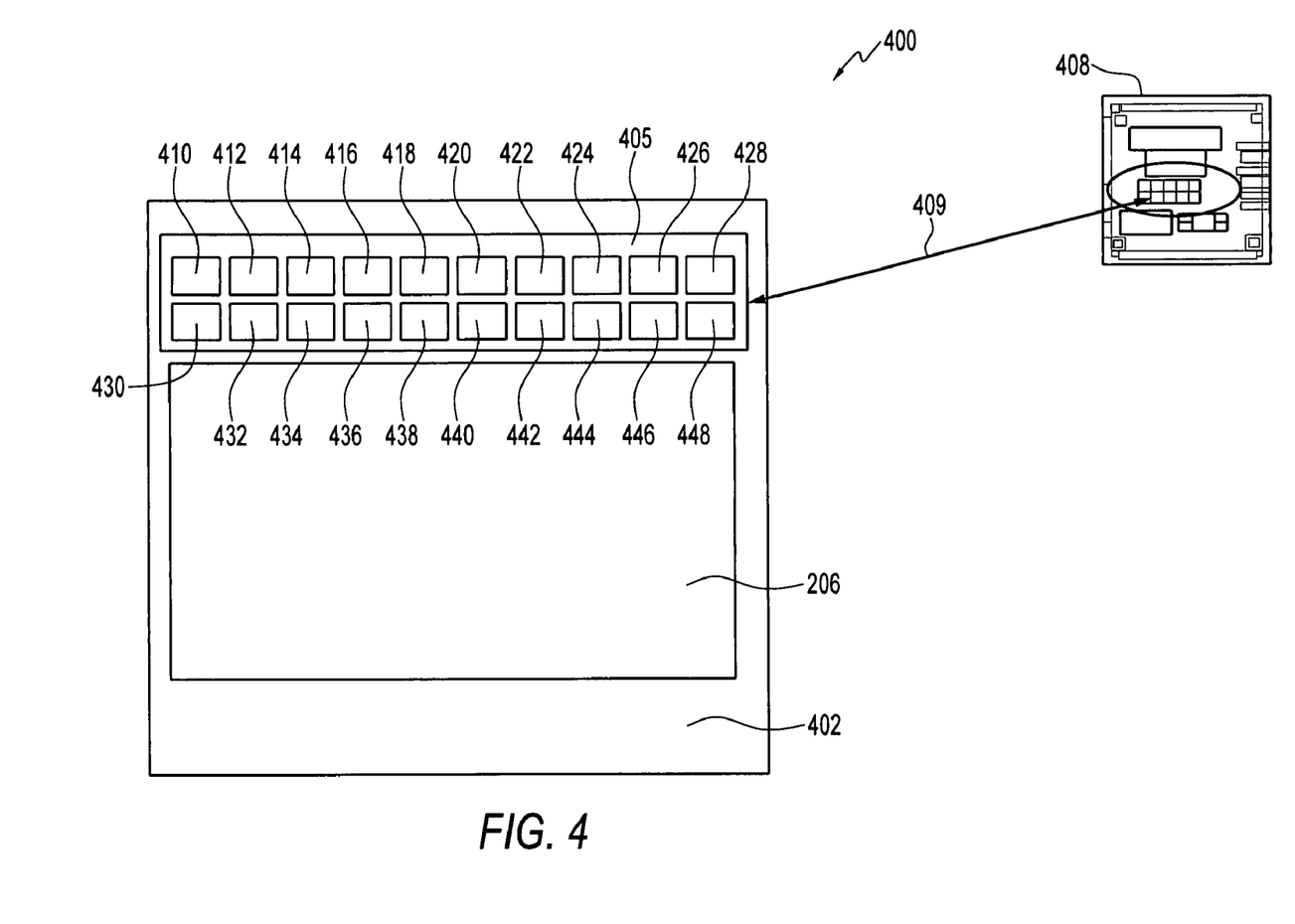
FIG. 4. illustrates a general layout diagram of a system that includes a third top wrapper in association with a cache memory hard macro, in accordance with a preferred embodiment.

FIG. 4 illustrates a general layout diagram of a system 400 that includes a third top wrapper 402 in association with a cache memory hard macro 206, in accordance with a preferred embodiment. In the configuration depicted in FIG. 4, the third top wrapper 402 can be, for example, an ARM926 soft/hard component, while the cache memory hard macro 206 may be an ARM926 component. In the layout configuration illustrated in FIG. 4, a plurality of memory components 410, 412, 414, 416, 418, 420, 422, 424, 426, 428, 430, 432, 434, 436, 438, 440, 442, 444, 446, and 448 are provided, which are generally contained within a cache memory hard macro 405, which is analogous, for example, to the cache memory hard macro 210 described earlier.

Arrow 409 indicates that a graphical user interface (GUI) 408 can be utilized to implement the configuration depicted in FIG. 4. Note that the top wrapper 402 is generally utilized to group the cache memory components 410, 412, 414, 416, 418, 420, 422, 424, 426, 428, 430, 432, 434, 436, 438, 440, 442, 444, 446, and 448 and the processor core 206. FIGS. 3-4 generally describe a diffused memory set implementation, which can be separated into diffused memory instances. Note that FIG. 5, which is explained in greater detail below, illustrates a configuration based on a combination of diffused memory instances.

Figure 5:
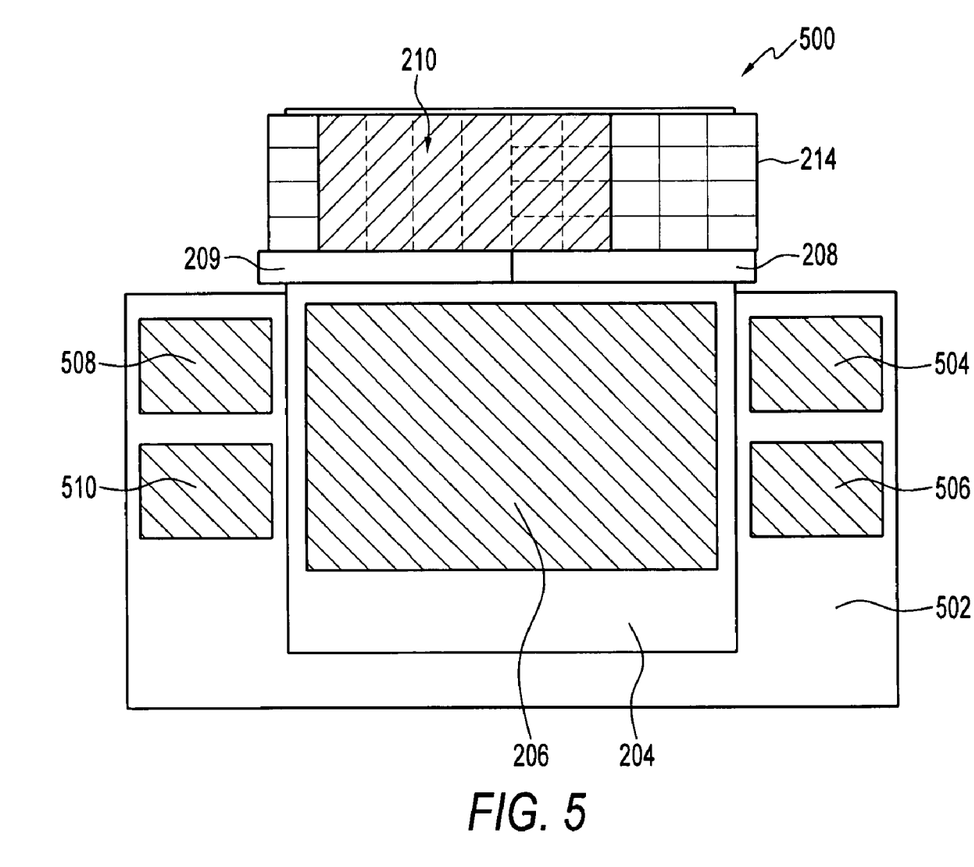
FIG. 5 illustrates a general layout diagram of a system that includes a general memory configuration, including a top wrapper soft area and the top wrapper soft area, which can be implemented in accordance with a preferred embodiment.

FIG. 5 illustrates a general layout diagram of a system 500 that includes a general memory configuration 500, including a top wrapper soft area 502 and the top wrapper soft area 204, which can be implemented in accordance with a preferred embodiment. In the embodiment depicted in FIG. 5, processor core hard macro 206 is depicted as contained within the top wrapper soft area 206, while core hard macro components 504, 506, 508, and 510 are disposed within the TCM wrapper soft area 502.

In general, the memory section 208 and the memory section 209 are located below or adjacent to the memory tiles 214. The cache memory hard macro 210 is generally superimposed over and/or above the memory section 208 and the memory tiles 214. By implementing the configuration depicted in FIG. 5, memory components are actually associated with the microprocessor. The processor core hard macro generally interfaces to the cache memory and optional TCM memory components. The top wrappers 204 and 504 can be utilized to group the cache memory tiles and TCM together.

Figure 6:
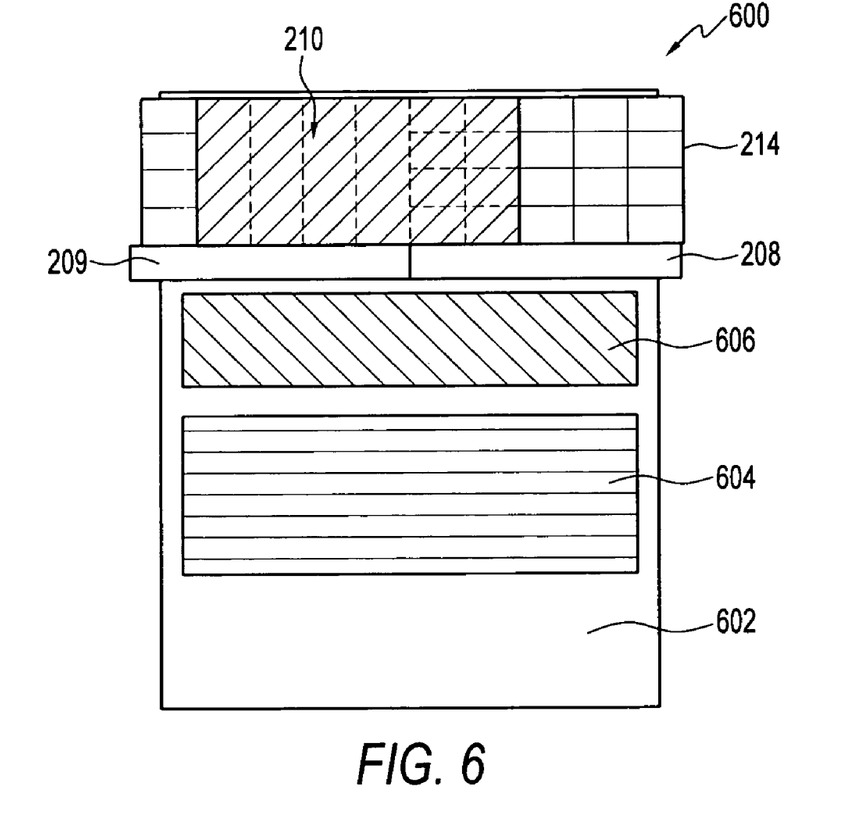
FIG. 6 illustrates a general layout diagram of a system that includes a separated cache controller, including a top wrapper to group cache, in association with a cache controller and process core, in accordance with a preferred embodiment.

FIG. 6 illustrates a general layout diagram of a system 600 constituting a separated cache controller, including a top wrapper to group cache, in association with a cache controller and process core, in accordance with a preferred embodiment. With respect to FIG. 6, it can be appreciated that cache controller hard macros address the specific requirements of cache size. The cache controller supports cache sizes of the processor (i.e., 4 Kbyte, 8 Kbyte, 16 Kbyte, and 32 Kbyte). In general, system 600 includes a top soft/hard wrapper 602 and a processor core hard macro 604. A cache controller hard macro 606 is also generally provided within the top wrapper area 602. Additionally, memory areas 208 and 209 are located adjacent the memory tiles 214.

In general, system 600, in association with the configurations depicted in FIG. 1-5, present different cache configurations and sizes, which are addressed by varying cache controllers. The processor core hard macro can be maintained for all configurations, while the top wrapper is utilized to group the cache, cache controller and core elements. The configurations depicted in FIGS. 1-6 generally implement a cached processor that supports a different size of instruction and data cache with a universal hard macro approach. This functionality can be achieved as illustrated in FIGS. 1-6 by providing for the separation of the processor core from the cache controller and the cached memories, which are essentially separated into separate modules and hard macros.

The processor core hard macro 206 depicted in FIGS. 1-6 is preferably implanted such that it supports a different cache controller for different cache sizes and the associative cache memory hard macros. For the different cache size memory such as, for example, 16 KByte, 32 Kbyte, a specific cache controller hard macro can be utilized. The top level wrappers described above with respect to FIGS. 1-6 are generally utilized to compound the processor core hard macro, the cache controller and the slice specific cache memory hard macro. The top level view of the top-level wrapper thus always appears the same. The top-level wrappers described above can be implemented as soft or hard macros, depending upon design considerations and the product being targeted.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A data-processing method, comprising:
providing a cached processor for processing data;
associating a plurality of memory components with said cached processor, wherein said cached processor is separated from said plurality of memory components while said cached processor provides support for said plurality of memory components, thereby providing a diffused memory architecture with diffused memory capabilities;
implementing said cached processor in a context of at least one macro and said plurality of memory components in a context of at least one other macro; and
utilizing a top level wrapper to compound said at least one macro and said at least one other macro.

2. A method comprising:
providing a processor macro wherein a processor is implemented in the context of the processor macro;
providing at least one memory macro wherein at least one memory component is implemented in the context of the at least one memory macro;
a step for grouping a set of macros comprising the processor macro and the at least one memory macro within a top wrapper; and
wherein a layout diagram comprises the top wrapper.

3. The method of claim 2 wherein the layout diagram further comprises at least one additional processor.

4. The method of claim 3 wherein said at least one memory component comprises a diffused memory component.

5. The method of claim 3 wherein said at least one memory component comprises a cache memory component.

6. The method of claim 3 wherein said at least one memory component comprises an R-Cell memory component.

7. A method comprising:
   providing a processor macro wherein a processor is implemented in the context of the processor macro;
   providing a cache controller macro wherein a cache controller is implemented in the context of the cache controller macro;
   a step for grouping a set of macros comprising the processor macro and the cache controller macro within a top wrapper; and
   wherein a layout diagram comprises the top wrapper.

8. The method of claim 7 wherein the group of macros further comprises at least one memory macro wherein at least one memory component is implemented in the context of the at least one memory macro.

9. The method of claim 8 wherein the layout diagram further comprises at least one additional processor.

10. The method of claim 9 wherein said at least one memory component comprises a diffused memory component.

11. The method of claim 9 wherein said at least one memory component comprises a cache memory component.

12. The method of claim 9 wherein said at least one memory component comprises an R-Cell memory component.

13. The method of claim 7 wherein the layout diagram further comprises at least one additional processor.

* * * * *